United States Patent [19]

Kemmer et al.

[11] 4,234,831

[45] Nov. 18, 1980

[54] COMPOUND ROTARY AND/OR LINEAR MOTOR

[76] Inventors: Josef Kemmer, No. 3, Ingolstadter Strasse, 8041 Haimhausen; Eckhard Kellner, No. 14, Obere Dorfstrasse, 8061 Viehbach, both of Fed. Rep. of Germany

[21] Appl. No.: 925,678

[22] Filed: Jul. 18, 1978

Related U.S. Application Data

[63] Continuation-in-part of Ser. No. 684,124, May 7, 1976, abandoned.

[51] Int. Cl.³ .............................................. H02K 7/06
[52] U.S. Cl. ...................................... 318/115; 310/12; 310/14; 310/80; 318/135
[58] Field of Search ................................ 310/80, 12–14; 318/135, 115, 37, 38

[56] References Cited

U.S. PATENT DOCUMENTS

| | | | |
|---|---|---|---|
| 3,394,295 | 7/1968 | Cory | 318/115 |
| 3,869,625 | 3/1975 | Sawyer | 318/115 X |
| 3,889,165 | 6/1975 | Van | 318/115 |
| 3,894,275 | 7/1975 | Baumans et al. | 318/115 X |
| 3,898,487 | 8/1975 | Sobiepanek | 310/80 |
| 4,099,106 | 7/1978 | Nikaido | 318/315 |

*Primary Examiner*—Donovan F. Duggan
*Attorney, Agent, or Firm*—John C. Smith, Jr.

[57] ABSTRACT

A compound rotary and/or linear motor comprises two interposed magnet systems of which at least one is variable by an electronic control system to generate rotary and/or linear motion of the other. One of the two magnet systems consists of axially consecutive arrangements, preferably rings, of electrically separate magnet poles. The other magnet system contains at least one pair of magnet poles. The electronic control system is designed optionally or according to program to generate rotary motion by sequentially energizing consecutive magnets in a ring, to generate linear motion by sequentially energizing axially consecutive magnets and to generate a combined linear and/or rotary motion by sequentially energizing consecutive magnets forming a helix.

5 Claims, 5 Drawing Figures

COMPOUND ROTARY AND/OR LINEAR MOTOR

This is a continuation-in-part of U.S. application Ser. No. 684,124, filed May 7, 1976 now abandoned.

BACKGROUND OF THE INVENTION

The invention relates to a compound rotary and/or linear motor comprising two interposed magnet systems of which at least one is variable by an electronic control system to generate rotary and/or linear motion of the other.

Such motors are useful for drives, such as those needed in the outputs of data processors for write-out and print-out systems, or for the control of relays. They are also of interest for driving drilling and boring machines.

In a known compound rotary and linear motor the rotary and axial motions of the rotor are generated by helical slots in the rotor and stator, an arrangement which has not been widely adopted in practice because of the complexities which it involves. In another known arrangement the armature of a motor can perform exclusively a combined rotary and linear motion between two adjacent stator coils. The defect of these arrangements is the short length of shift available in the axial direction and the absence of freedom of choice between rotary, linear or combined rotary and linear motions.

SUMMARY OF THE INVENTION

It is the object of the present invention to avoid the defects of the known arrangements and to provide a simple arrangement for a compound rotary and/or linear motor capable of performing rotary or linear or combined rotary and linear motions.

According to the invention this is achieved in a motor of such a kind wherein one of the two magnet systems consists of axially consecutive arrangements, preferably rings, of electrically separate magnet poles, whereas the other magnet system contains at least one pair of magnet poles, and wherein the electronic control system is designed optionally or according to program to generate rotary motion by sequentially energizing consecutive magnets in a ring, to generate linear motion by sequentially energizing axially consecutive magnets and to generate a combined linear and rotary motion by sequentially energizing consecutive magnets forming a helix.

An arrangement which is technically easy to realize for generating the rotary, linear and combined rotary and linear motions consists in axially associating the stators of conventional AC or DC motors to form a novel stator system. The axial length of the rotor is so chosen that its ends extend into the neighboring stator sections on either side. By controllably varying the magnet field in two adjacent stator sections the rotor can be shifted to and fro while rotating at the same time.

If use is made of the stators and rotors of stepping motors, then the resultant combination permits rotary, linear and combined rotary and linear motions of the rotor to be produced.

The advantages achieved by the invention reside in that compound rotary and/or linear motors can be built up on the unit construction principle from prefabricated commercially available stator and rotor parts, and that the rotary, linear and combined rotary and linear motions can be controlled by means of conventional electronic control systems. The rotary, linear or combined rotary and linear motions can be brought to a stop in any desired axial or angular position, as in the case of a stepping motor. Since a large number of different types of motors having a variety of properties are available to provide the basic components, rotary and linear motors according to the invention can be composed to suit any specification.

Another important advantage is that the length of the linear shift can be readily increased by adding more stator sections.

BRIEF DESCRIPTION OF THE DRAWINGS

An embodiment of a linear and/or rotary motor according to the invention which is also suitable for the transmission of linear and rotary motion into a vacuum chamber will now be described by way of example and with reference to the accompanying drawings, in which.

DESCRIPTION OF THE PREFERRED EMBODIMENT

Figure 1:
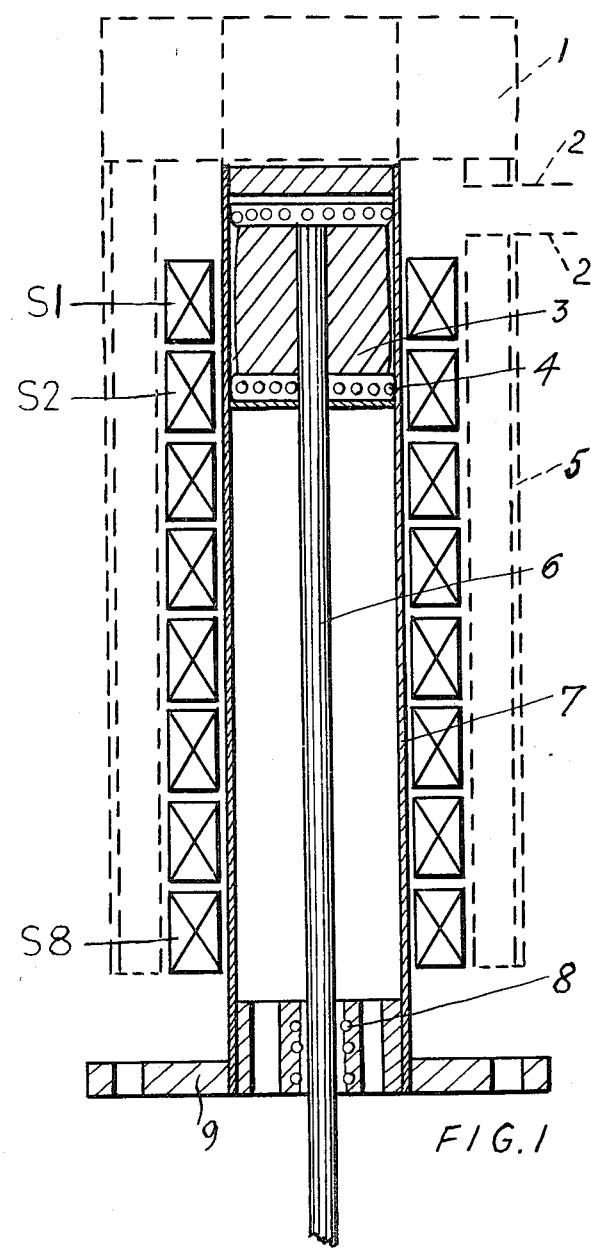
FIG. 1 is a cross-section of the cylindrical stator casing of a compound linear and/or rotary motor according to the invention.

Basically the proposed motor, as shown in FIG. 1, comprises a cylindrical liner 7 of non-magnetic material, preferably chrome-nickel steel, having one closed and one open end formed with a flange 9. Slidable inside this cylindrical liner 7 with the interposition of caged peripheral ball bearings 4 is a rotor 3 in the form of a permanent magnet adapted to transmit its rotary and/or axial motions through a shaft 6 likewise mounted in caged ball bearings 8.

For electromagnetically generating axial and rotary motions of the rotor 3 there are provided on the outside of the cylindrical liner 7 a series of stator sections S1, S2 ... S8 of stepping motors so designed that the rotor 3 occupies the space surrounded by about two or more sections. The speed of rotation of the rotor can be varied by making use of a technique well known in the operation of stepping motors, and this also includes stopping the rotor in any desired angular position. For axially shifting the rotor the current sent through the stator section S1 in which the rotor 3 is situtated is reduced and at the same time that in the next stator section S2 is increased, etc. In this way the rotor 3 can be shifted from one end to the other of all the sections.

The four magnet poles for each of the stators S1–S8 are designated P11, P12, P13, P14 for S-1; P21, P22, P23, P24 for S2; etc. Control signals p1–p4 are illustrated in FIG. 3. These are fed via control lines P1–P4 in FIG. 2 to the transistor groups T11, T21 ... T81; T12, T22 ... T82; T13, T23 ... T83; and T14, T24 ... T84. The control signals p1–p4 are gener⁣ted by well known commercially available electronic components commonly used with stepping motors. The above described system serves to sequentially energize the magnetic poles of the plurality of stators to maintain a predetermined rotation of the rotor irrespective of its axial position. Thus, for example, with reference to stator segment S1, rotary movement of the rotor will be achieved by successive triggering of the magnetic poles P11 . . . P14 by control signals p1, p2, p3 and p4. As a result of control signal p1, the switching transistor T11 is switched to "passage" so that a current will flow from the voltage source through the winding of the first magnet pole T11 of the stator segment S1 and via a second switching transistor T1 to the mass. The second magnet pole T12 is activated correspondingly by a control signal p2, etc. The permanent magnet rotor follows the magnetization cycle and thus executes a rotary movement.

To obtain axial movement of the rotor, the magnetic poles lying axially side by side are successively triggered. The stators S1 . . . S8 are arranged such that the first magnet pole P11 in stator S1 is directly beside the first magnet pole P21 in stator S2, etc. The windings of the axially consecutive poles are switched in parallel via the control lines P1-P4 so they can be activated simultaneously. Therefore, the switching transistors T11, T21, T31 . . . T81 are switched to "passage" simultaneously by the control signal p1 so that the first magnet poles P11 . . . P84 of each of the segments S1-S8 laying linearly side by side may be magnetized. To prevent the current from flowing through all stator segments, a second switching transistor T1-T8 is always provided. Whenever T1 is switched to "passage", the current will flow through stator S1; whenever T2 is switched for "passage"; current will flow through stator S2; etc.

Whenever the switching transistor T1 is blocked slowly and T2 is simultaneously opened slowly, the rotor will move axially without rotation and evenly from stator S1 to stator S2.

Finally the rotary, axial and combined rotary and axial motions can be programmed by using an appropriate electronic control system, and these motions can be stopped in preselected positions.

In order to ensure precise control of the rotor 3 in the axial direction the magnetic flux at each end face is attenuated so tht in the embodiment according to FIG. 1 the maximum field intensity is obtained within the width of each stator section. As indicated in FIG. 1, the diameter of the ends of the rotor are decreased so as to increase the gap between the end of the rotor and the stator, thus decreasing the flux. This particular method for decreasing the flux is well known.

For the abstraction of joulean heat the entire arrangement may be provided with a cooling jacket 5 and preferably with an axial flow fan 1.

If the number of stator sections were reduced to only one, the linear and rotary motor would deteriorate into a simple stepping motor or, if designed as shown in FIG. 1, it could become a transmission means for the introduction of rotary motion into a vacuum.

The reference numeral 2 in FIG. 1 denotes terminals for the supply of current.

Figure 2:
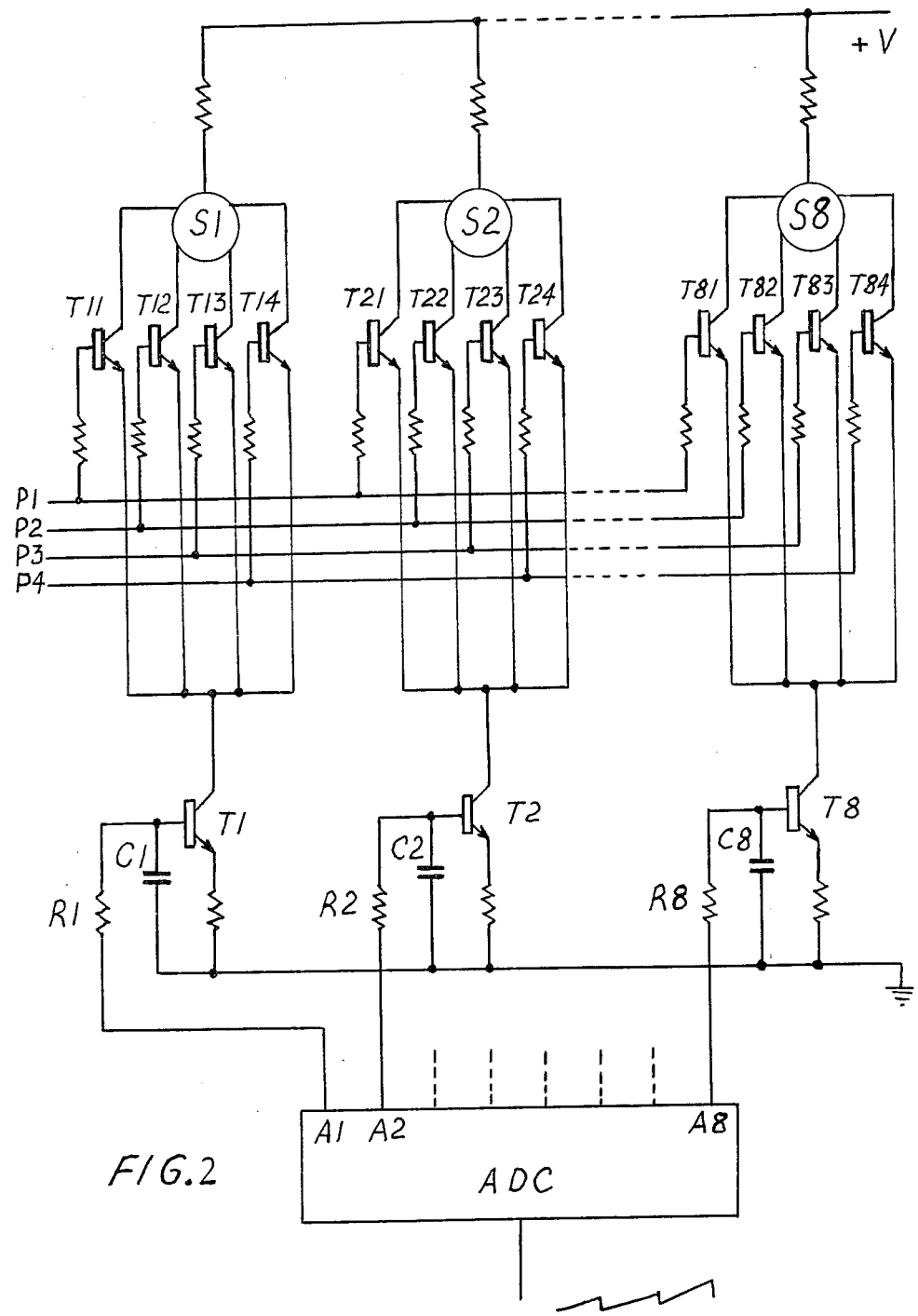
FIG. 2 is a circuit diagram of an electronic control system for such a linear and/or rotary motor.
Figure 3:
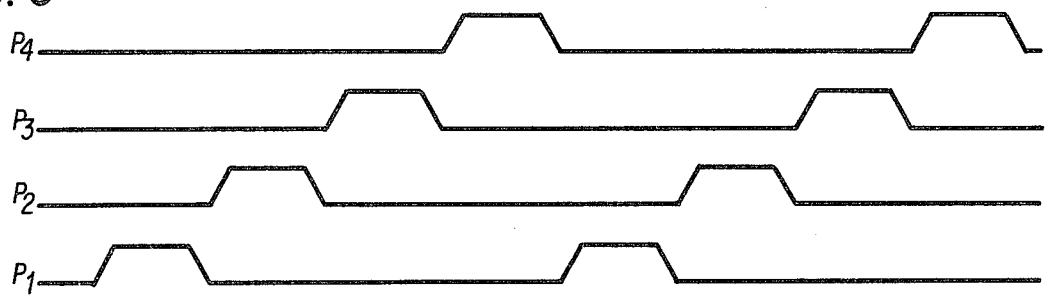
FIG. 3 is a graphical illustration of the energization sequence of the control signals.

FIG. 2 shows how the speed of rotation of the rotor 3 is regulated by controlling the magnet poles P11 . . . P84 of the stepping motor sections S1 . . . S8 by means of ordinary commercially available electronic components. Control signals p1-p4 are fed via control lines P1-P4 to the transistor groups T11, T21 . . . T81; T12, T22 . . . T82; T13, T23 . . . T83; and T14, T24 . . . T84; which will switch the latter by groups in sequence.

Suitable control signals are applied to switching transistors $T_i1$, $T_i2$, $T_i3$, and $T_i4$ ($i=1, 2, .. 8$) and thereby turning them on. If the rotor is to rotate in section S1, transistor T1 will be turned on.

In order to shift the rotor in the axial direction, T1 is gradually turned off and T2 is turned on, etc.

The control signals are provided by an analog-to-digital converter (ADC) containin a number of outputs $A_i$ corresponding to the number of coil sections $S_i$. Resistors $R_i$ and capacitors $C_i$ convert the square wave signals supplied by the ADC to permit a continuous changeover from $T_i$ to $(T_i+T_{i\pm1})$ and $T_{i\pm1}$.

Figure 4:
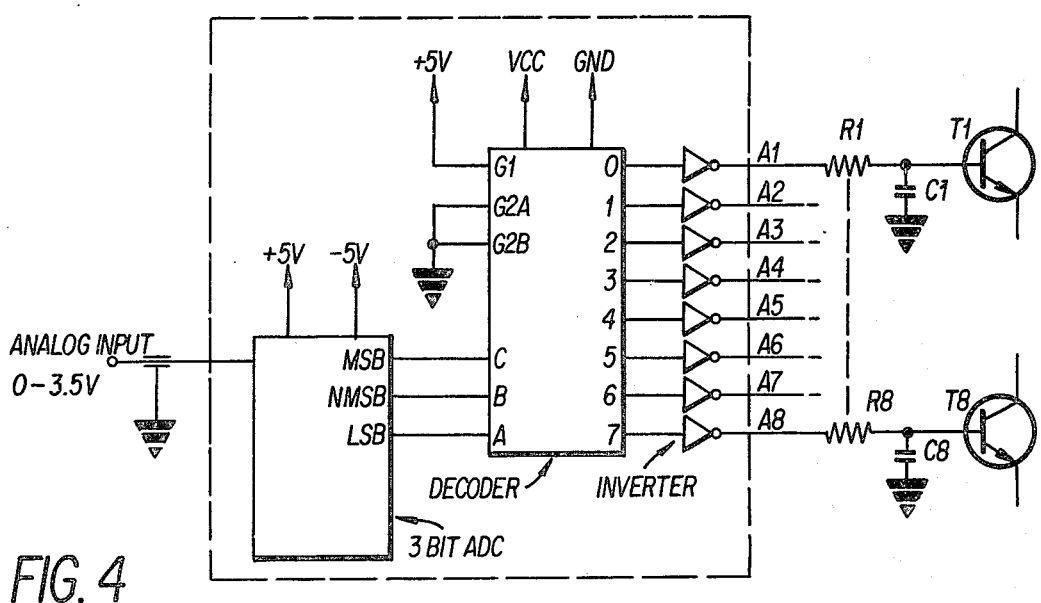
FIG. 4 is a schematic illustration of one embodiment of a circuit for continuously triggering the switching transistors of FIG. 2.
Figure 4:
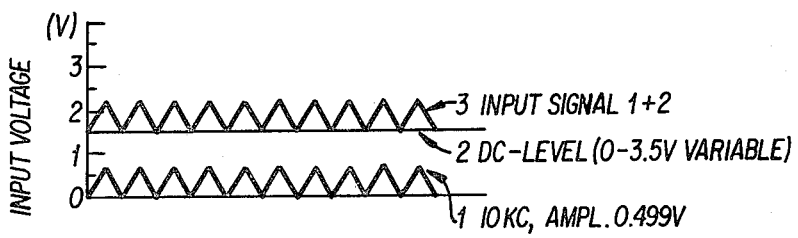
Figure 5:
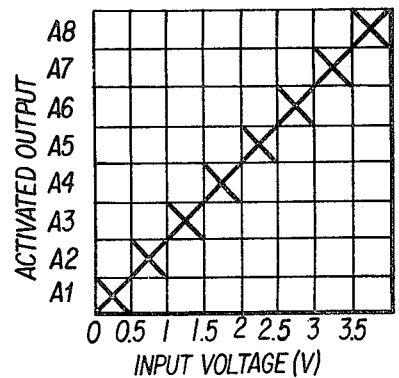
FIG. 5 is a schematic illustration of the successive triggering of the outlets $A_1 \ldots A_8$ of FIG. 4.

Referring to FIG. 4, the circuit consists of a 3 BIT ADC, such as is available commercially from Fairchild Microwave and Optoelectronics Division of Fairchild Camera and Instrument Corporation and identified as $\mu$ A 760 High Speed Differential Comparator, a decoder commercially available from Texas Instruments Corporation (S.N. S74 138 N) and eight inverters also available from Texas Instruments (SN 7404) which serve for inverting the outlet from "low" to "high". This entire system, for simplicity's sake, has been designated as "ADC" in FIG. 2. In case of a change of the input voltage between 0 V and 3.5 V successively, one outlet A1 . . . A8 is always activated as shown in FIG. 5.

To prevent the switching transistors T1 . . . T8 to change over in sudden bursts, the RC-members R1 C1 . . . R8 C8 have been inserted. Moreover, as indicated in FIG. 4, a sawtooth or triangle signal of about 10 KHZ is superposed on the analogous input voltage (for example, from a functional generator manufactured by Wavetek Indiana, Inc.). The maximum amplitude of the sawtooth or triangle is $\leq 0.5$ V, for example, 0.499 V.

The method of operation is as follows:

Whenever the DC voltage signal (for example, DC offset of the Wafetek-generators) amounts to 0 V, then there is a sawtooth or triangle signal at the inlet of the 3-BIT ADC's of 0.499 V amplitude and of a frequency of 10 KHZ, i.e., outlet A1 is activated. Whenever now, the DC voltage (or DC offset) is increased to 0.2 V, then the total voltage on which the sawtooth or triangle signal is superposed, lies between 0.2 V and 0.699 V, i.e. during 3/5 of the time outlet A1 and during about 2/5 of the time outlet A2 is activated. The switching over from A1 to A2 and vice versa is accomplished so fast (under the illustrated example for 10 KHZ) that on the basis of the RC members R1 C1 and R2 C2, a medium voltage appears on the base of the transistor T1 and T2 which is directly proportional to the duration of activation of the corresponding outlets. In the example, the potential at the base of T1 amounts to about 3/5 and on the base of T2 to about 2/5 of the maximum base voltage. That means that transistor T1 is switched of about 3/5 and T2 at about 2/5 for passage, since the state of switching is determined by the voltage on the base.

By further increasing the inlet voltage (DC-offset on the Wafetek) up to 3.5 V it will thus be possible to switch over from T1 to T8 and vice versa, continuously and at any speed.

Thus, commercially available electronic equipment permits the rotary and axial motions of the motor to be controlled according to a program. The resultant movements of the rotor could be monitored by a mechanical, capacitive, inductive or electro-optical derivation of a signal for instance from the rotor shaft 6. These signals could be used for control purposes in a loop.

In order to satisfy varying applicational needs the mounting of the rotor may deviate from that shown in the embodiment. The rotor may be fast on a shaft running in two bearings which also permit sliding displacement of the shaft. Alternatively the rotor may contain a central bore for loosely mounting it on a fixed shaft. The rotary and axial motions of the rotor may then be transmitted by a hollow shaft surrounding the fixed shaft. Finally, and as shown in the illustrated embodiment, the rotor may be provided on its peripheral surface near each end with a caged ball bearing which runs on the inside surface of the cylindrical stator liner. In such a case the rotary and axial motions can be transmitted by a shaft which is fast with the rotor. If the rotary motion is required to transmit considerable torque, then this can be achieved by an appropriate choice of the basic motor type, e.g. armature wound DC motor, or by the provision of several rotors or by making use of reduction gearings integrated with the rotor. Such reduction gearings may be mechanical or hydraulic, and the gearing itself may be mechanically or electro-magnetically locked to prevent it from participating in the rotation.

The invention may be embodied in other specific forms without departing from the spirit or essential characteristics thereof. The embodiments are therefore to be considered in all respects as illustrative and not restrictive.

We claim:

1. A compound rotary and linear motor comprising
   (a) a first stationary magnet system comprising consecutive stator sections arranged along a predetermined axis, each stator section including a plurality of electrically separate consecutive magnets arranged in a ring, the magnetic poles of consecutive stator sections lying side by side in axial alignment;
   (b) a second magnet system comprising a rotor including at least one pair of magnet poles;
   (c) said first and second magnet systems being interposed;
   (d) means mounting said rotor for rotary movement about said axis and for linear movement along said axis; and
   (e) an electronic control system responsive to control signals and adapted to sequentially energize said consecutive magnets of each stator section to rotate said rotor and to independently sequentially energize axially consecutive magnets to move said rotor axially;
   (f) whereby said motor may independently generate rotary, linear and helical motions.

2. A compound rotary and linear motor as defined in claim 1 wherein the ends of said rotor when positioned at a stator section extend into the neighboring stator sections and the magnetic flux at the end faces of said rotor is attenuated.

3. A compound rotary and linear motor as defined in claim 2 further comprising peripheral caged ball bearings, said rotor running in said bearings.

4. A compound rotary and linear motor as defined in claim 3 further comprising a cylindrical liner of non-magnetic material which is closed at one end, the other end containing an anti-friction sliding bearing in a flange.

5. A compound rotary and linear motor as defined in claim 4 wherein said first stationary magnet system is adjustable in relation to said cylindrical liner.

* * * * *